US012679549B2

(12) United States Patent
Kupratis

(10) Patent No.: US 12,679,549 B2
(45) Date of Patent: Jul. 14, 2026

(54) PARTIALLY SHROUDED AIRCRAFT PROPULSION SYSTEM

(71) Applicant: RTX Corporation, Farmington, CT (US)

(72) Inventor: Daniel B. Kupratis, Wallingford, CT (US)

(73) Assignee: RTX Corporation, Farmington, CT (US)

( * ) Notice: Subject to any disclaimer, the term of this patent is extended or adjusted under 35 U.S.C. 154(b) by 196 days.

(21) Appl. No.: 18/437,700

(22) Filed: Feb. 9, 2024

(65) Prior Publication Data

US 2025/0256857 A1 Aug. 14, 2025

(51) Int. Cl.
B64D 27/40 (2024.01)
B64D 27/10 (2006.01)
B64C 39/10 (2006.01)

(52) U.S. Cl.
CPC ............ B64D 27/40 (2024.01); B64D 27/10 (2013.01); B64C 2039/105 (2013.01)

(58) Field of Classification Search
CPC .... B64D 27/40; B64D 27/10; B64C 2039/105
See application file for complete search history.

(56) References Cited

U.S. PATENT DOCUMENTS

| | | |
|---|---|---|
| 10,954,890 B2 | 3/2021 | Moore |
| 11,396,365 B2 | 7/2022 | Page |

| | | | |
|---|---|---|---|
| 2016/0318606 A1 | 11/2016 | Rahrig | |
| 2018/0128183 A1* | 5/2018 | Escure ................... | B64D 35/06 |
| 2019/0010895 A1* | 1/2019 | Moore ................... | F02K 1/827 |
| 2022/0033067 A1* | 2/2022 | Page ..................... | B64D 33/04 |
| 2023/0322382 A1* | 10/2023 | Dindar .................. | B64C 21/01 |
| | | | 244/36 |

FOREIGN PATENT DOCUMENTS

CH 711721 B1 10/2020

OTHER PUBLICATIONS

EP Search Report for EP Patent Application No. 25156962.0 dated May 19, 2025.

* cited by examiner

*Primary Examiner* — Kimberly S Berona
*Assistant Examiner* — Steven J Shur
(74) *Attorney, Agent, or Firm* — Getz Balich LLC

(57) ABSTRACT

An assembly is provided for an aircraft. This assembly includes a first propulsor rotor, a powerplant and a propulsion system housing. The powerplant is configured to drive rotation of the first propulsor rotor about an axis. The propulsion system housing includes an inner structure and an outer structure with a bypass flowpath radially between the inner structure and the outer structure. The bypass flowpath is downstream of the first propulsor rotor and extends axially along the inner structure and the outer structure within the propulsion system housing. The inner structure extends axially along and circumferentially around the powerplant. The outer structure extends axially along and partially circumferentially about the first propulsor rotor to cover an outer periphery of a first circumferential sector of the first propulsor rotor. A remaining second circumferential sector of the first propulsor rotor is open to an environment outside of the propulsion system housing.

17 Claims, 14 Drawing Sheets

PARTIALLY SHROUDED AIRCRAFT PROPULSION SYSTEM

BACKGROUND OF THE DISCLOSURE

1. Technical Field

This disclosure relates generally to an aircraft and, more particularly, to a propulsion system for the aircraft.

2. Background Information

Various types and configurations of aircraft propulsion systems are known in the art. Some of these known aircraft propulsion systems include a ducted propulsor rotor, and some of the known aircraft propulsion systems include one or more open propulsor rotors. While these known aircraft propulsion systems have various benefits, there is still room in the art for improvement.

SUMMARY OF THE DISCLOSURE

According to an aspect of the present disclosure, an assembly is provided for an aircraft. This assembly includes a first propulsor rotor, a powerplant and a propulsion system housing. The powerplant is configured to drive rotation of the first propulsor rotor about an axis. The propulsion system housing includes an inner structure and an outer structure with a bypass flowpath radially between the inner structure and the outer structure. The bypass flowpath is downstream of the first propulsor rotor and extends axially along the inner structure and the outer structure within the propulsion system housing. The inner structure extends axially along and circumferentially around the powerplant. The outer structure extends axially along and partially circumferentially about the first propulsor rotor to cover an outer periphery of a first circumferential sector of the first propulsor rotor. A remaining second circumferential sector of the first propulsor rotor is open to an environment outside of the propulsion system housing.

According to another aspect of the present disclosure, another assembly is provided for an aircraft. This assembly includes an airframe structure, an aircraft propulsion system and a propulsion system bypass flowpath. The aircraft propulsion system is mounted to the airframe structure. The aircraft propulsion system includes a first propulsor rotor, a powerplant, a propulsion system housing and a powerplant bypass flowpath. The powerplant is configured to drive rotation of the first propulsor rotor about an axis. The propulsion system housing includes an inner structure and an outer structure. The inner structure houses the powerplant. The outer structure houses a first circumferential sector of the first propulsor rotor with a remaining second circumferential sector of the first propulsor rotor exposed to an environment outside of the aircraft propulsion system. The powerplant bypass flowpath is between the inner structure and the outer structure and bypasses the powerplant. The propulsion system bypass flowpath is between the outer structure and the airframe structure and bypasses the aircraft propulsion system.

According to still another aspect of the present disclosure, another assembly is provided for an aircraft. This assembly includes a first propulsor rotor, a powerplant and a propulsion system housing. The powerplant is configured to drive rotation of the first propulsor rotor about an axis. The propulsion system housing includes an inner structure, an outer structure and a plurality of guide vanes with a bypass flowpath radially between the inner structure and the outer structure. The bypass flowpath is downstream of the first propulsor rotor and extends axially along the inner structure and the outer structure within the propulsion system housing. The inner structure circumscribes the powerplant. The outer structure extends circumferentially about the first propulsor rotor and the inner structure between opposing circumferential sides of the outer structure. Each of the opposing circumferential sides of the outer structure is exposed to an environment outside of the propulsion system housing. Each of the guide vanes extends radially across the bypass flowpath from the inner structure to the outer structure.

The outer structure may extend circumferentially about the axis, between one-hundred and twenty degrees and one-hundred and eighty degrees, between opposing circumferential sides of the outer structure.

The outer structure may extend circumferentially about the axis between opposing circumferential sides of the outer structure. Each of the opposing circumferential sides of the outer structure may be exposed to the environment outside of the aircraft propulsion system.

The first circumferential sector may extend circumferentially about the axis between ninety degrees and two-hundred and forty degrees. The remaining second circumferential sector may extend circumferentially about the axis between and to opposing circumferential ends of the first circumferential sector.

A first portion of the first propulsor rotor within the first circumferential sector may be operable as a ducted propulsor rotor. A second portion of the first propulsor rotor within the first circumferential sector may be operable as an open propulsor rotor.

The propulsion system housing may be configured as or otherwise include a nacelle.

The assembly may also include a plurality of guide vanes arranged circumferentially about the axis. Each of the guide vanes may extend radially across the bypass flowpath and couple the inner structure to the outer structure.

The guide vanes may include a first guide vane, a second guide vane and a third guide vane disposed circumferentially between and next to the first guide vane and the second guide vane. The first guide vane may be circumferentially spaced from the third guide vane by a first circumferential distance. The second guide vane may be circumferentially spaced from the third guide vane by a second circumferential distance that is different than the first circumferential distance.

The assembly may also include a lobed mixer configured to mix bypass air exhausted from the bypass flowpath with combustion products exhausted from a turbine engine core. The powerplant may include the turbine engine core. The lobed mixer may be configured with a plurality of mixer lobes. Each of the mixer lobes may be circumferentially aligned with a respective one of the guide vanes.

The guide vanes may include a plurality of ducted guide vanes. The assembly may also include a guide vane structure including the ducted guide vanes and a plurality of open guide vanes arranged with the ducted guide vanes in an annular array about the axis.

The assembly may also include an arcuate guide vane structure which includes the guide vanes.

The assembly may also include a lobed mixer configured to mix bypass air exhausted from the bypass flowpath with combustion products exhausted from a turbine engine core. The powerplant may include the turbine engine core. The lobed mixer may extend axially along and partially circumferentially about the axis. The lobed mixer may be circumferentially aligned with the outer structure about the axis.

The assembly may also include a second propulsor rotor. The powerplant may be configured to drive rotation of the first propulsor rotor a first direction about the axis. The powerplant may also be configured to drive rotation of the second propulsor rotor a second direction about the axis.

The powerplant may include a turbine engine core.

The assembly may also include a nose cone upstream of and rotatable with the first propulsor rotor. A tip of the nose cone may be axially aligned with or axially recessed from a leading edge of the outer structure.

The assembly may also include a pylon projecting radially out from the outer structure.

The assembly may also include an airframe structure, an aircraft propulsion system and a second bypass flowpath. The aircraft propulsion system may be mounted to the airframe structure. The aircraft propulsion system may include the first propulsor rotor, the powerplant and the propulsion system housing. The second bypass flowpath may be formed by and between the outer structure and the airframe structure. The second bypass flowpath may extend axially along the outer structure and the airframe structure outside of the aircraft propulsion system.

The airframe structure may be configured as a fuselage of a blended wing body aircraft.

The aircraft propulsion system may be disposed to a gravitational top side of the airframe structure.

The aircraft propulsion system may be disposed in a recess in the airframe structure.

A corner between a leading edge of the outer structure and a circumferential side of the outer structure may be eased.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
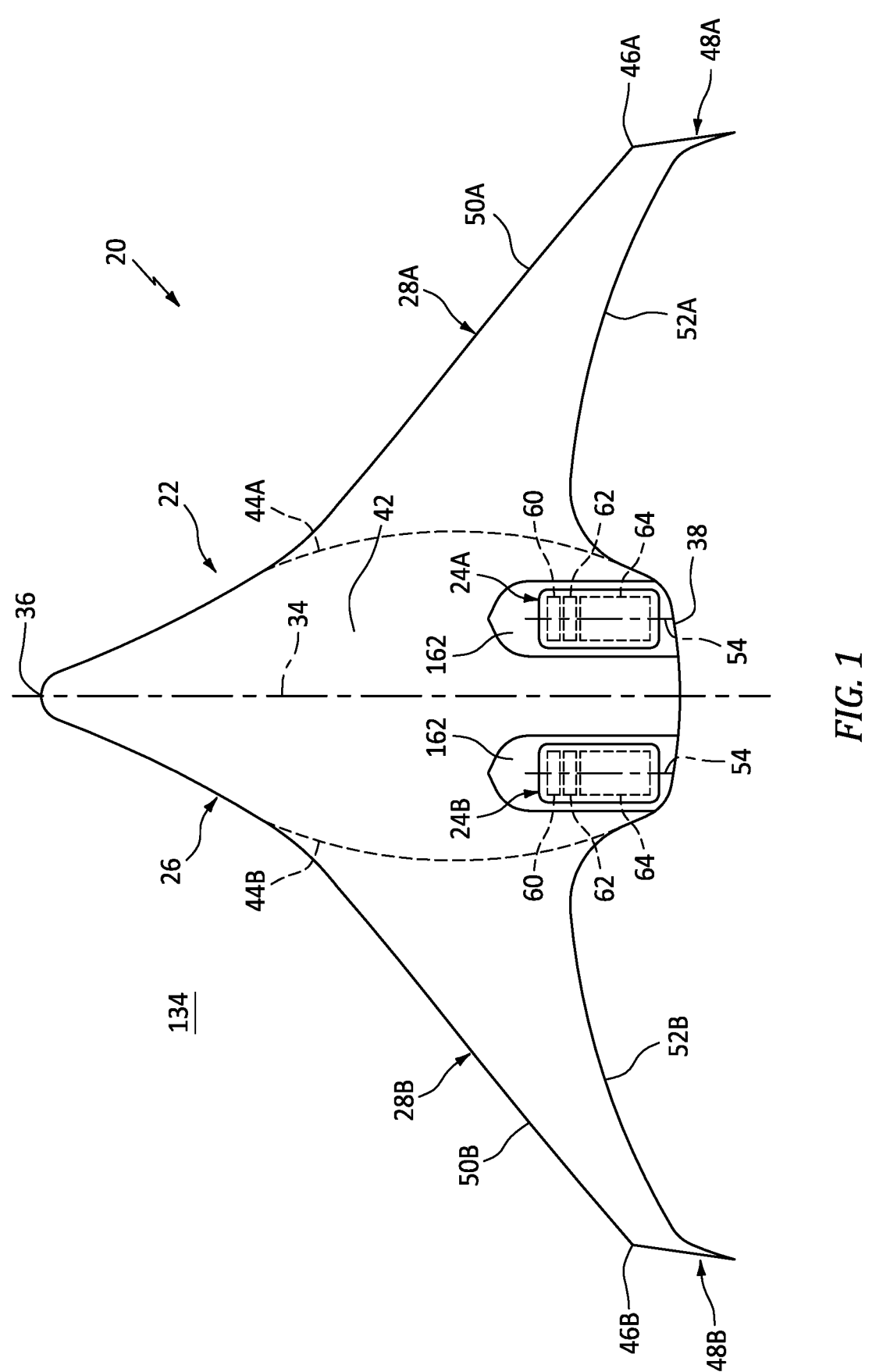
FIG. 1 is a plan view illustration of an aircraft.

FIG. 1 illustrates a blended wing body (BWB) aircraft 20. This aircraft 20 includes an airframe 22 and one or more propulsion systems 24A and 24B (generally referred to as "24"), schematically and generically shown in FIGS. 1-3. The aircraft airframe 22 of FIG. 1 includes a body 26 (e.g., a fuselage) and one or more wings 28A and 28B (generally referred to as "28").

Figure 2:
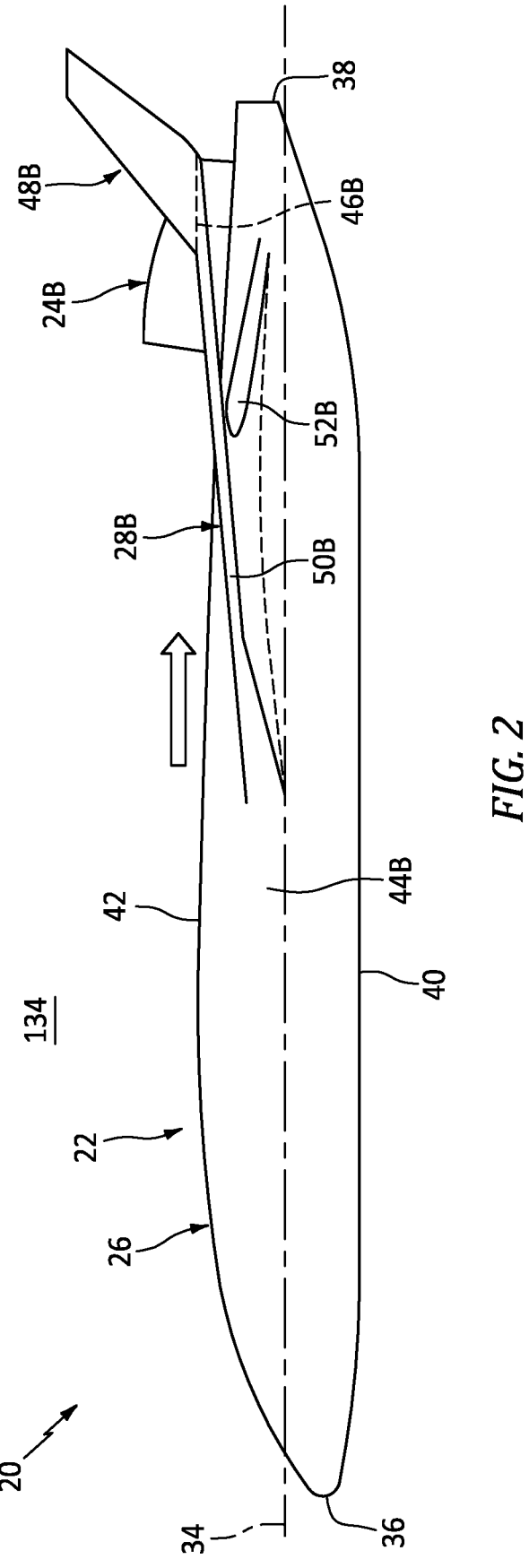
FIG. 2 is a side view illustration of the aircraft.
Figure 3:
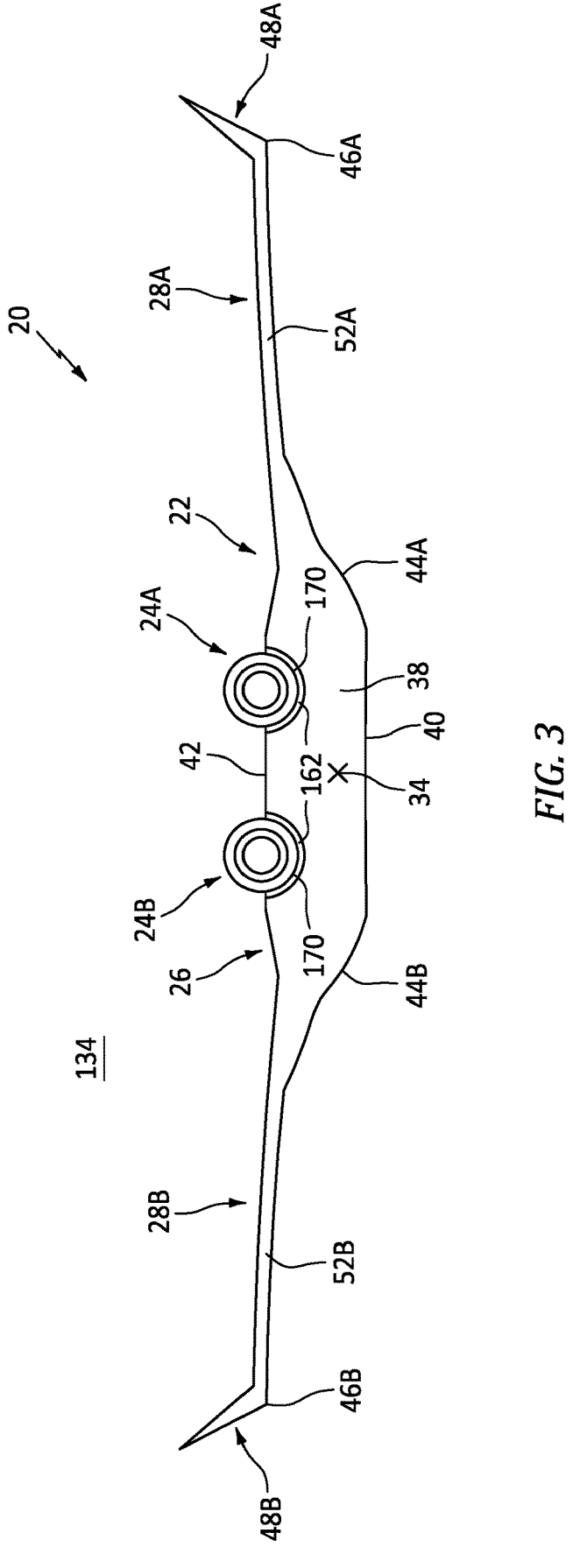
FIG. 3 is a rear end view illustration of the aircraft.

The aircraft body 26 extends longitudinally along a centerline 34 between and to an upstream, forward end 36 (e.g., a nose) of the aircraft body 26 and a downstream, aft end 38 of the aircraft body 26. This centerline 34 may be a centerline axis of the aircraft 20, the aircraft airframe 22 and/or the aircraft body 26. Referring to FIG. 2, the centerline 34 may be substantially (e.g., within +/–five degrees) or completely parallel with a horizon line when the aircraft 20 is flying in level flight. The aircraft body 26 extends vertically between and to opposing vertical bottom and top sides 40 and 42 of the aircraft body 26. The body bottom side 40 is vertically below the body top side 42 with respect to a gravitational direction when the aircraft 20 is flying in level flight. Referring to FIGS. 1 and 3, the aircraft body 26 extends laterally between and to opposing lateral sides 44A and 44B (generally referred to as "44") of the aircraft body 26.

The aircraft wings 28 of FIGS. 1 and 3 are arranged to the opposing lateral sides 44 of the aircraft body 26. Each of the aircraft wings 28 is connected to (e.g., fixed to) the aircraft body 26. Each of the aircraft wings 28A, 28B projects spanwise along a span line of the respective aircraft wing 28 out from the aircraft body 26, at the respective body lateral side 44A, 44B, to a distal tip 46A, 46B of the respective aircraft wing 28. At the wing tip 46A, 46B, the respective aircraft wing 28 may (or may not) be configured with a winglet 48A, 48B. Each of the aircraft wings 28A, 28B of FIG. 1 extends longitudinally along a mean line of the respective aircraft wing 28A, 28B from a leading edge 50A, 50B (generally referred to as "50") of the respective aircraft wing 28 to a trailing edge 52A, 52B (generally referred to as "52") of the respective aircraft wing 28. The wing leading edge 50 of FIG. 1, at a base of the respective aircraft wing 28, is longitudinally spaced aft, downstream from the body forward end 36. The wing trailing edge 52 of FIG. 1, at the wing base, is longitudinally spaced forward, upstream from the body aft end 38. The present disclosure, however, is not limited to such an exemplary aircraft wing arrangement.

Figure 4:
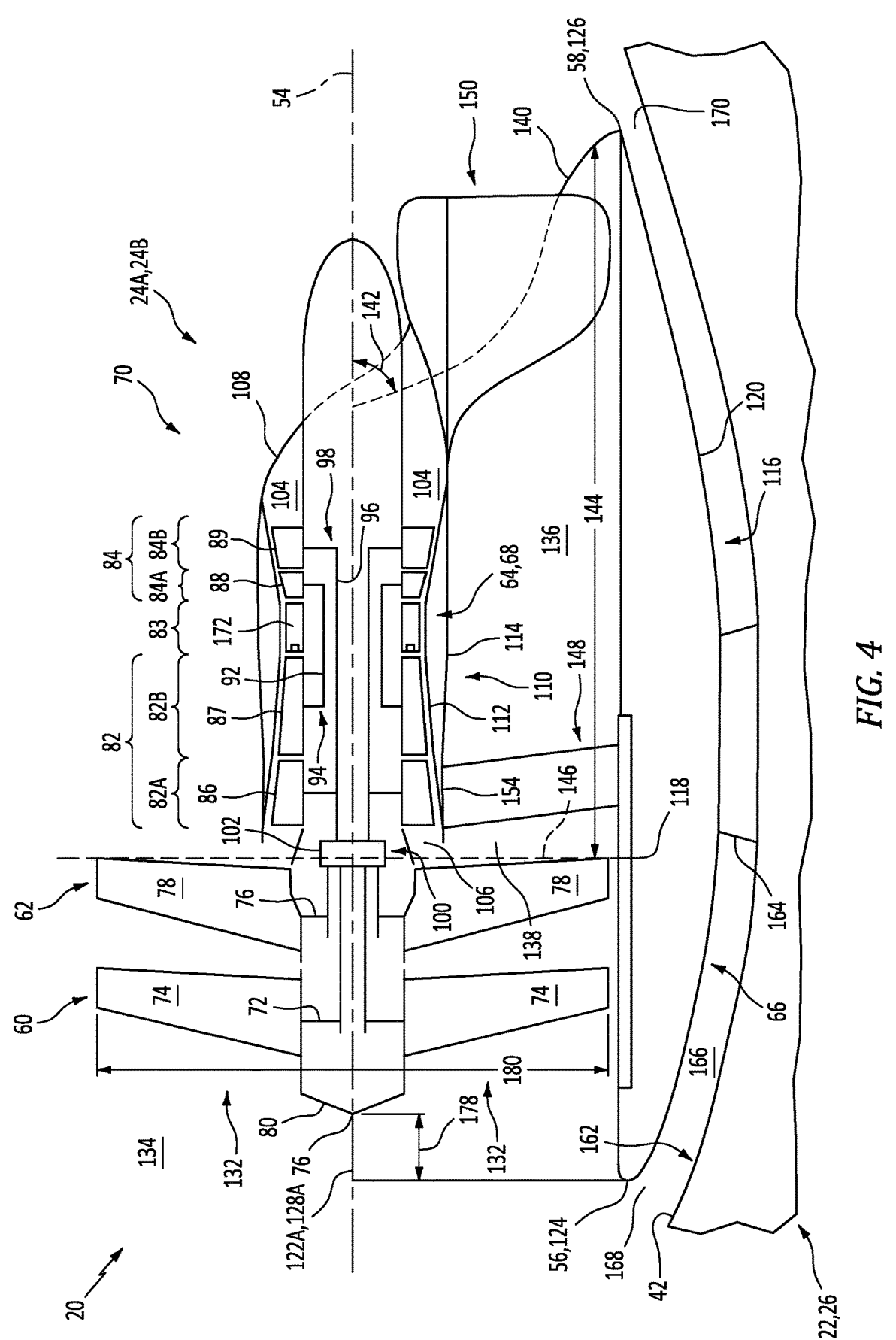
FIG. 4 is a schematic side sectional illustration of a propulsion system mounted to an airframe component.

Referring to FIG. 4, each aircraft propulsion system 24 extends axially along an axis 54 from an upstream, forward end 56 of the respective aircraft propulsion system 24 to a downstream, aft end 58 of the respective aircraft propulsion system 24. This axis 54 may be a centerline axis of the respective aircraft propulsion system 24 and/or one or more components of the respective aircraft propulsion system 24. The axis 54 may also or alternatively be a rotational axis of one or more components of the respective aircraft propulsion system 24. Each aircraft propulsion system 24 includes one or more propulsion system propulsor rotors 60 and 62 (e.g., counterrotating propulsor rotors), a propulsion system powerplant 64 and a propulsion system housing 66. For ease of description, the propulsion system powerplant 64 is described below as a core 68 of a turbine engine 70 (e.g., a gas generator), where the turbine engine core 68 is configured to drive rotation of the propulsor rotors 60 and 62 of the turbine engine 70. The present disclosure, however, is not limited to turbine engine aircraft propulsion systems. The propulsion system powerplant 64, for example, may alternatively be configured as a rotary internal combustion (IC) engine, a hybrid-electric engine or an electric motor which drives rotation of the propulsor rotors 60 and 62.

The first propulsor rotor 60 (e.g., an upstream, forward propulsor rotor) is configured to rotate a first circumferential direction (e.g., a clockwise direction, or a counterclockwise direction) about the axis 54. This first propulsor rotor 60 includes a first rotor base 72 (e.g., a hub or a disk) and a plurality of first propulsor blades 74. The first propulsor blades 74 are arranged circumferentially around the first rotor base 72 in an array; e.g., a circular array. The first propulsor blades 74 are connected to (e.g., formed integral with or otherwise attached to) the first rotor base 72. Each of the first propulsor blades 74 projects spanwise along a span line of the respective first propulsor blade 74 out from the first rotor base 72 to an outer tip of the respective first propulsor blade 74.

The second propulsor rotor 62 (e.g., a downstream, aft propulsor rotor) is configured to rotate a second circumferential direction (e.g., the counterclockwise direction, or the clockwise direction) about the axis 54, where the second circumferential direction is opposite of the first circumferential direction. This second propulsor rotor 62 includes a second rotor base 76 (e.g., a hub or a disk) and a plurality of second propulsor blades 78. The second propulsor blades 78 are arranged circumferentially around the second rotor base 76 in an array; e.g., a circular array. The second propulsor blades 78 are connected to (e.g., formed integral with or otherwise attached to) the second rotor base 76. Each of the second propulsor blades 78 projects spanwise along a span line of the respective second propulsor blade 78 out from the second rotor base 76 to an outer tip of the respective second propulsor blade 78.

The first propulsor rotor 60 is arranged forward and upstream of the second propulsor rotor 62. The first propulsor rotor 60 of FIG. 4, for example, is located axially between and next to (e.g., adjacent) an inlet nose cone 80 and the second propulsor rotor 62. This nose cone 80 may be configured as a spinner. The nose cone 80 of FIG. 4, for example, is coupled to and rotates with the first propulsor rotor 60. The second propulsor rotor 62 of FIG. 4 is located axially between the first propulsor rotor 60 and the propulsion system powerplant 64; e.g., the turbine engine core 68.

The propulsion system powerplant 64 of FIG. 4 includes a compressor section 82, a combustor section 83 and a turbine section 84. The compressor section 82 of FIG. 4 includes a low pressure compressor (LPC) section 82A and a high pressure compressor (HPC) section 82B. The turbine section 84 of FIG. 4 includes a high pressure turbine (HPT) section 84A and a low pressure turbine (LPT) section 84B.

Each of the powerplant sections 82A, 82B, 84A and 84B includes a respective bladed rotor 86-89. Each of these bladed rotors 86-89 includes a plurality of rotor blades arranged circumferentially around and connected to one or more respective rotor disks or hubs. The rotor blades, for example, may be formed integral with or mechanically fastened, welded, brazed and/or otherwise attached to the respective rotor disk(s) or hub(s).

The HPC rotor 87 is coupled to and rotatable with the HPT rotor 88. The HPC rotor 87 of FIG. 4, for example, is connected to the HPT rotor 88 through a high speed shaft 92. At least (or only) the HPC rotor 87, the HPT rotor 88 and the high speed shaft 92 may collectively form a high speed rotating assembly 94; e.g., a high speed spool of the turbine engine core 68. The high speed rotating assembly 94 of FIG. 4 and its members 87, 88 and 92 are configured to rotate about the axis 54.

The LPC rotor 86 is coupled to and rotatable with the LPT rotor 89. The LPC rotor 86 of FIG. 4, for example, is connected to the LPT rotor 89 through a low speed shaft 96. At least (or only) the LPC rotor 86, the LPT rotor 89 and the low speed shaft 96 may collectively form a low speed rotating assembly 98; e.g., a low speed spool of the turbine engine core 68. The low speed rotating assembly 98 of FIG. 4 and its members 86, 89 and 96 are configured to rotate about the axis 54.

The low speed rotating assembly 98 is coupled to and rotatable with each of the counterrotating propulsor rotors 60 and 62 through a drivetrain 100. The drivetrain 100 of FIG. 4 is configured as a geared drivetrain, where a geartrain 102 (e.g., a transmission, a speed change device, an epicyclic geartrain, etc.) is disposed between and operatively couples each propulsor rotor to the low speed rotating assembly 98 and its LPT rotor 89. With this arrangement, the counterrotating propulsor rotors 60 and 62 may each rotate at a different (e.g., slower) rotational velocity than the low speed rotating assembly 98 and its LPT rotor 89. Moreover, the geartrain 102 may facilitate the rotation of the propulsor rotors 60 and 62 in their opposing circumferential directions about the axis 54.

An annular core flowpath 104 extends through the propulsion system powerplant 64 (e.g., the turbine engine core 68) from an airflow inlet 106 into the core flowpath 104 to a combustion products exhaust 108 from the core flowpath 104. The core flowpath 104 of FIG. 4, for example, extends sequentially through the LPC section 82A, the HPC section 82B, the combustor section 83, the HPT section 84A and the LPT section 84B between the core inlet 106 and the core exhaust 108. The core inlet 106 of FIG. 4 is disposed axially downstream of and next to the second propulsor rotor 62.

The powerplant sections 82A-84B are arranged (e.g., sequentially along the axis 54) within a full-hoop stationary inner structure 110 of the propulsion system housing 66. The housing inner structure 110 of FIG. 4 includes a full-hoop inner case 112 (e.g., a core case) and a full-hoop inner structure 114 of a nacelle for the respective aircraft propulsion system 24; e.g., an inner fixed structure (IFS). The inner case 112 houses the propulsion system powerplant 64 and its powerplant sections 82A-84B. The inner case 112 of FIG. 4, for example, extends axially along and circumferentially around (e.g., circumscribes) each of the powerplant sections 82A-84B and the respective powerplant section rotors 86-89. The nacelle inner structure 114 houses and provides an aerodynamic cover over the inner case 112 and, thus, the propulsion system powerplant 64 and its powerplant sections 82A-84B. The nacelle inner structure 114 of FIG. 4, for example, extends axially along and circumferentially around (e.g., circumscribes) the inner case 112.

Figures 5, 6:
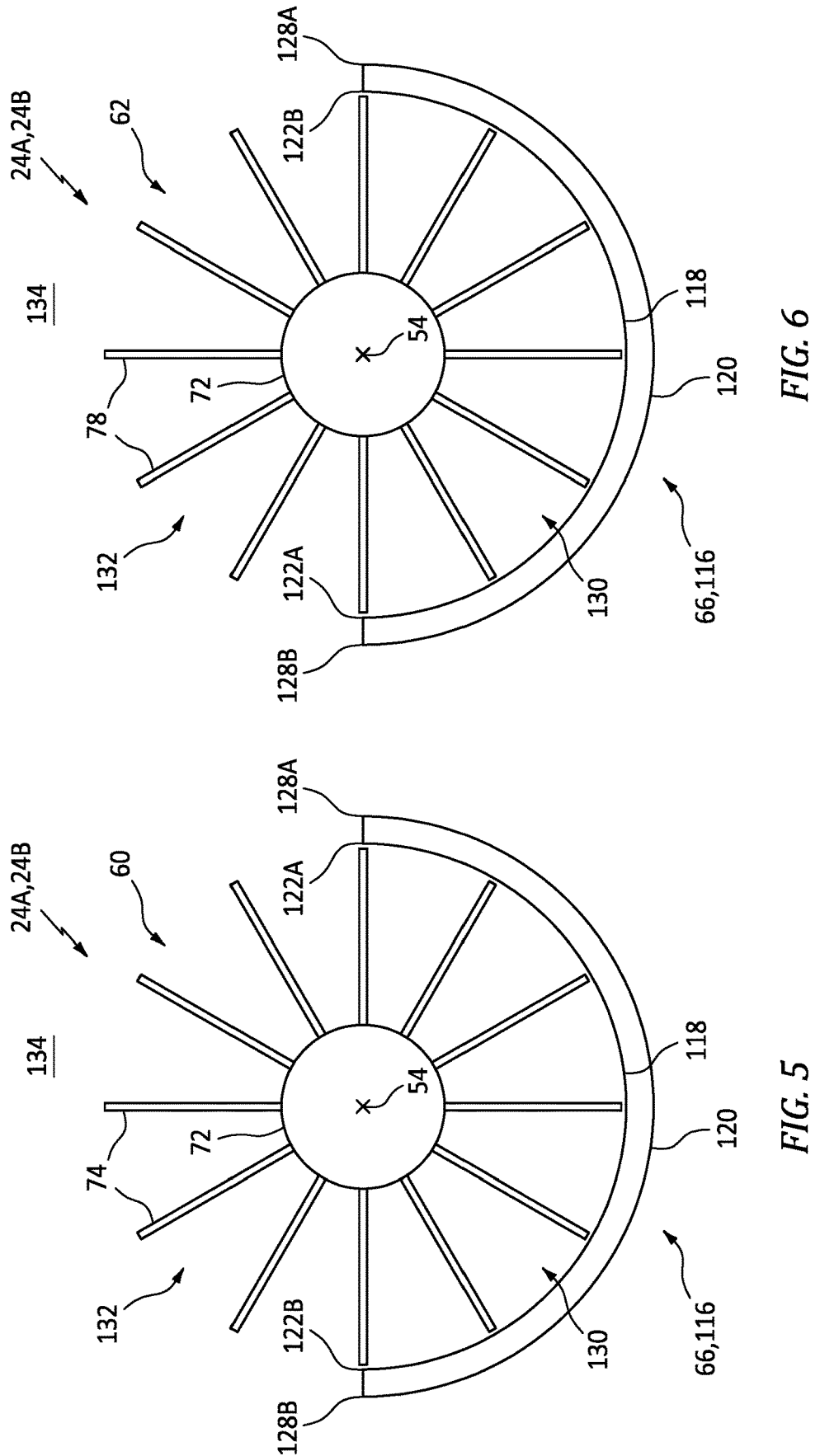
FIG. 5 is a schematic cross-sectional illustration of the propulsion system at an upstream, forward propulsor rotor.
FIG. 6 is a schematic cross-sectional illustration of the propulsion system at a downstream, aft propulsor rotor.

The counterrotating propulsor rotors 60 and 62 are arranged partially within (e.g., partially shrouded by) an arcuate stationary outer structure 116 of the propulsion system housing 66. The housing outer structure 116 of FIG. 4, for example, includes an arcuate outer case 118 (e.g., fan case, a containment case, etc.) and an arcuate outer structure 120 of the nacelle. The outer case 118 partially houses the counterrotating propulsor rotors 60 and 62. The outer case 118 of FIG. 4, for example, extends axially along each of the counterrotating propulsor rotors 60 and 62. Referring to FIGS. 5 and 6, the outer case 118 extends partially circumferentially about each propulsor rotor 60, 62 and the axis 54 between opposing circumferential sides 122A and 122B (generally referred to as "122") of the outer case 118. Referring to FIG. 4, the nacelle outer structure 120 houses and provides an aerodynamic cover over the outer case 118 and, thus, the counterrotating propulsor rotors 60 and 62. The nacelle outer structure 120 is also spaced radially outboard from and overlaps at least an axial portion (e.g., an entirety) of the nacelle inner structure 114 downstream of the counterrotating propulsor rotors 60 and 62. The nacelle outer structure 120 of FIG. 4, for example, extends axially along the counterrotating propulsor rotors 60 and 62 and the nacelle inner structure 114 from a leading edge 124 of the propulsion system housing 66 and its nacelle outer structure 120 to a trailing edge 126 of the propulsion system housing 66 and its nacelle outer structure 120. Referring to FIGS. 5 and 6, the nacelle outer structure 120 extends partially circumferentially about each propulsor rotor 60, 62, the nacelle inner structure 114 and the axis 54 opposing circumferential sides 128A and 128B (generally referred to as "128") of the housing outer structure 116 and its nacelle outer structure 120.

The housing outer structure 116 and its members 118 and 120 cover (e.g., shroud) an outer periphery of a shrouded (e.g., ducted) circumferential sector 130 (e.g., a circular sector) of each propulsor rotor 60, 62. By contrast, a remaining open circumferential sector 132 of each propulsor rotor 60, 62 is uncovered; e.g., unshrouded. The open circumferential sector 132 of each propulsor rotor 60, 62 of FIGS. 5 and 6 is thereby open to an environment 134 external to the respective aircraft propulsion system 24 and, more generally, the aircraft. The shrouded circumferential sector 130 may extend circumferentially about the axis 54 between ninety degrees (90°) and two-hundred and forty degrees (240°); e.g., between one-hundred and twenty degrees (120°) and one-hundred and eighty degrees (180°) or two-hundred degrees (200°). The open circumferential sector 132 extends circumferentially about the axis 54 between and to the opposing circumferential sides 128 of the housing outer structure 116 and its nacelle outer structure 120. With this arrangement, a portion of each propulsor rotor 60, 62 in the shrouded circumferential sector 130 may operate as a ducted/shrouded propulsor rotor (e.g., a fan rotor) of the respective aircraft propulsion system 24. A remaining portion of each propulsor rotor 60, 62 in the open circumferential sector 132 may operate as an open (e.g., un-ducted, un-shrouded) propulsor rotor of the respective aircraft propulsion system 24.

Referring to FIG. 4, an arcuate powerplant bypass flowpath 136 is formed within the propulsion system housing 66 radially between the housing inner structure 110 and the housing outer structure 116. This powerplant bypass flowpath 136 extends longitudinally (e.g., axially along the axis 54) from an airflow inlet 138 into the powerplant bypass flowpath 136 to an airflow exhaust 140 from the powerplant bypass flowpath 136. The powerplant bypass inlet 138 of FIG. 4 is disposed axially downstream of and next to the second propulsor rotor 62. This powerplant bypass inlet 138 is radially outboard of and may be substantially axially aligned with the core inlet 106. The powerplant bypass exhaust 140 is disposed at the outer structure trailing edge 126. The housing inner structure 110 and its nacelle inner structure 114 form a radial inner peripheral boundary of the powerplant bypass flowpath 136. The housing outer structure 116 and its members 118 and 120 form a radial outer peripheral boundary of the powerplant bypass flowpath 136. The powerplant bypass flowpath 136 also extends circumferentially about the axis 54 through the propulsion system housing 66 between opposing circumferential open sides of the powerplant bypass flowpath 136. With the arrangement of FIG. 4, the powerplant bypass flowpath 136 bypasses (e.g., extends around and outside of) the propulsion system powerplant 64 and its powerplant sections 82A-84B.

The outer structure trailing edge 126 and, thus, the powerplant bypass exhaust 140 may have a canted configuration. At least a section or an entirety of the outer structure trailing edge 126 of FIG. 4, for example, is angularly offset from the axis 54 by an offset angle 142 when viewed, for example, in a first reference plane parallel with (e.g., including or laterally offset from) the axis 54. The offset angle 142 is a non-zero acute angle, which offset angle 142 may vary between fifteen degrees (15°) and eight-five degrees (85°) for example.

The outer structure trailing edge 126 is axially spaced from the axially closest propulsor rotor (e.g., the second propulsor rotor 62) by an axial distance 144. More particularly, the outer structure trailing edge 126 of FIG. 4 is axially spaced from a second reference plane 146 defined by an aft, downstream side of the second propulsor rotor 62 by the axial distance 144, which second reference plane 146 is perpendicular to the axis 54. The axial distance 144 increases as each half of the outer structure trailing edge 126 extends circumferentially about the axis 54 from a respective one of the opposing circumferential sides 128 of the housing outer structure 116 and its nacelle outer structure 120 towards (or to) a circumferential intermediate location (e.g., a midpoint) or a circumferential intermediate region along the outer structure trailing edge 126. This increase in the axial distance 144 may be continuous or iterative. A slope of the increase in the axial distance 144 may be constant or variable. For example, the increase in the axial distance 144 from each circumferential side 128 to the intermediate point or the intermediate region in FIG. 4 is continuous with a variable slope. With this arrangement, at least a portion or an entirety of each half of the outer structure trailing edge 126 may be curved; e.g., splined, arcuate, wavy, etc.

Figure 7:
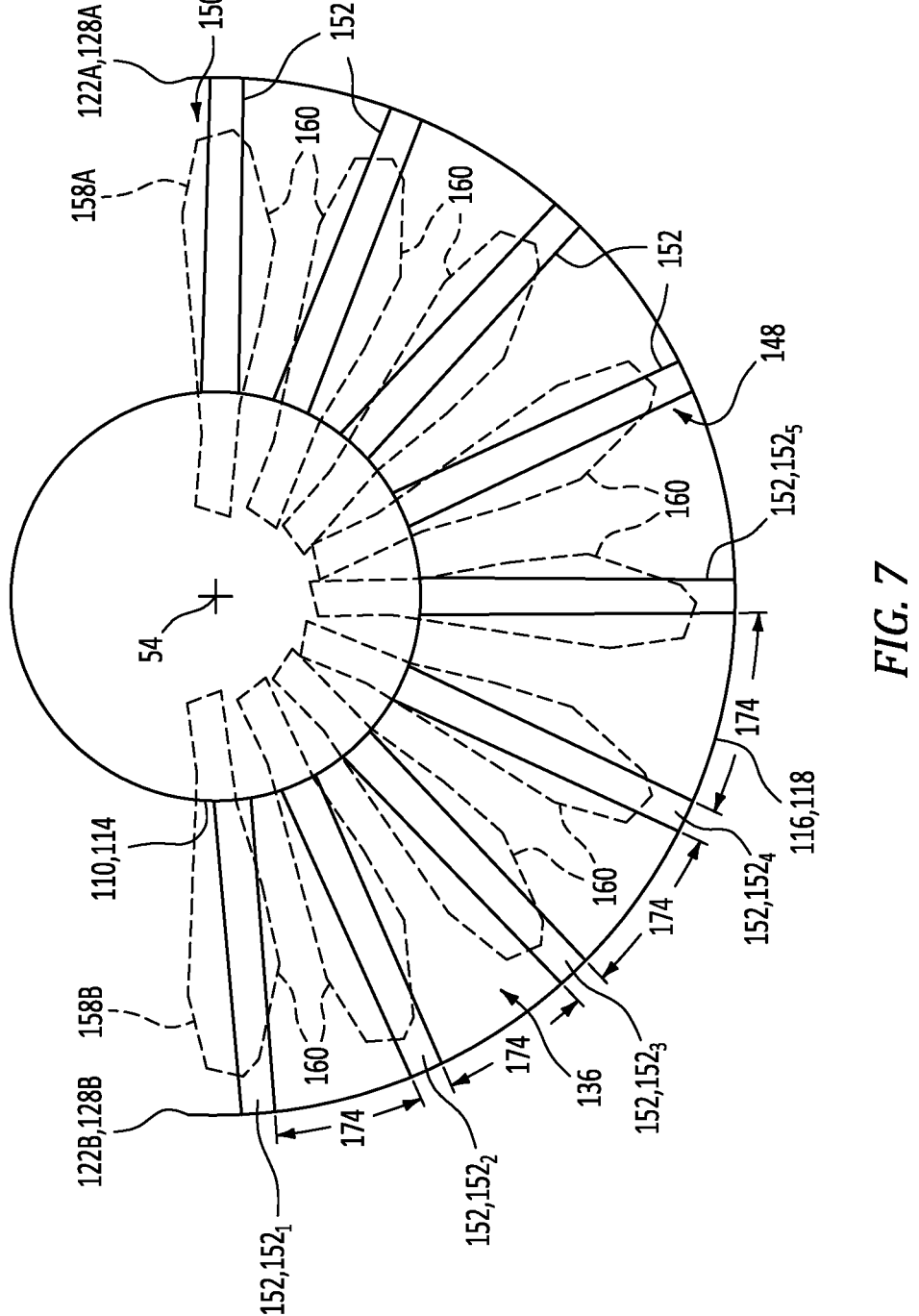
FIG. 7 is a schematic cross-sectional illustration of the propulsion system at a guide vane array with a lobed mixer overlaid on the guide vane array in dashed lines.

Each aircraft propulsion system 24 of FIG. 4 also includes a guide vane structure 148 and a lobed mixer 150. The guide vane structure 148 is arranged along the powerplant bypass flowpath 136 between the second propulsor rotor 62 and the powerplant bypass exhaust 140. The guide vane structure 148 of FIG. 4, for example, is disposed at (e.g., on, adjacent or proximate) the powerplant bypass inlet 138. Referring to FIG. 7, the guide vane structure 148 includes a plurality of guide vanes 152 arranged circumferentially about the axis 54 in an arcuate array; e.g., a semi-circular array. Each of the guide vanes 152 extends radially across the powerplant bypass flowpath 136 from the inner peripheral boundary of the powerplant bypass flowpath 136 to the outer peripheral boundary of the powerplant bypass flowpath 136. Referring to FIG. 4, each of the guide vanes 152 may also be connected (e.g., structurally tied) to the outer case 118 and a frame structure 154 of the housing inner structure 110, which frame structure 154 is connected to the inner case 112. With this arrangement, the guide vane structure 148 and its guide vanes 152 are configured to condition (e.g., straighten out) air propelled into the powerplant bypass flowpath 136 by the counterrotating propulsor rotors 60 and 62.

The lobed mixer 150 is configured to mix bypass air exhausted from the powerplant bypass flowpath 136 with combustion products exhausted from the propulsion system powerplant 64 and its core flowpath 104. The lobed mixer 150 of FIG. 4, for example, is arranged at and radially between the powerplant bypass exhaust 140 and the core exhaust 108. This lobed mixer 150 is connected to at least one component of the housing inner structure 110 radially between the powerplant bypass flowpath 136 and the core flowpath 104; e.g., the inner case 112 and/or the nacelle inner structure 114.

Figure 8:
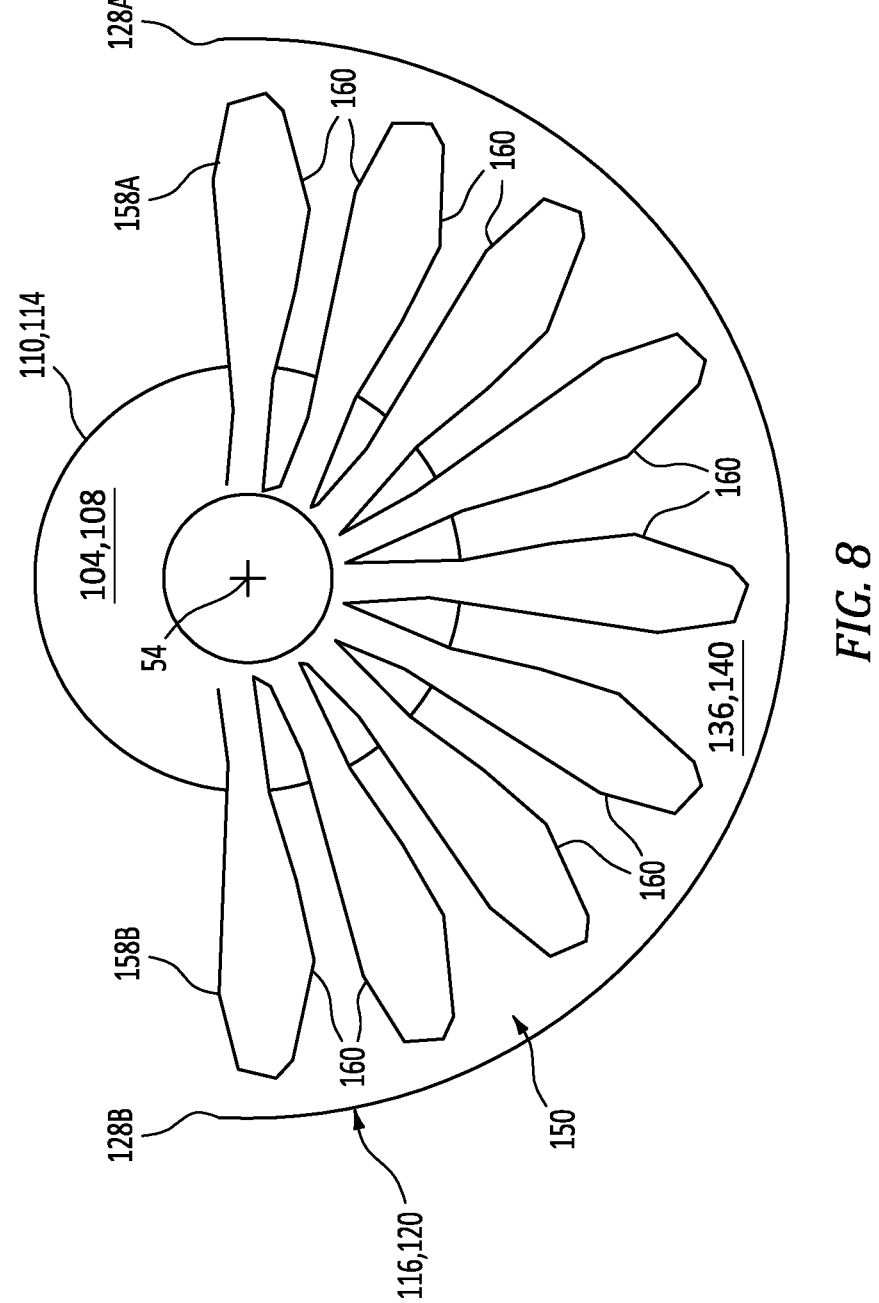
FIG. 8 is a schematic cross-sectional illustration of the propulsion system at the lobed mixer.

Referring to FIG. 8, the lobed mixer 150 is configured as an arcuate lobed mixer; e.g., a semi-annular lobed mixer. The lobed mixer 150 of FIG. 8, for example, extends partially circumferentially about the axis 54 between circumferentially opposing sides 158A and 158B of the lobed mixer 150, where the mixer sides 158A, 158B may be circumferentially aligned with (or near) the structure sides 128A, 128B. The lobed mixer 150 of FIG. 8 includes a plurality of mixer lobes 160 arranged circumferentially about the axis 54 between the mixer sides 158A, 158B in an arcuate array; e.g., a semi-circular array. One of the mixer lobes 160 may define the first mixer side 158A and where another one of the mixer lobes 160 may define the second mixer side 158B. Each of the mixer lobes 160 may have a similar or a common (the same) configuration; e.g., shape, dimensions (e.g., radial height, circumferential width), etc. The present disclosure, however, is not limited to such an exemplary arrangement.

Referring to FIG. 1, the aircraft propulsion systems 24 are arranged laterally side-by-side along the aircraft body 26 at the body top side 42 and/or the body aft end 38. These aircraft propulsion systems 24 are disposed to opposing lateral sides of the centerline 34, where the axis 54 of each aircraft propulsion system 24 may be arranged parallel with the centerline 34. The aircraft propulsion systems 24 are also equilaterally spaced from the centerline 34. Referring to FIGS. 1 and 3, each aircraft propulsion system 24 may be disposed in a recess 162 (e.g., a pocket, an indentation, etc.) in the aircraft body 26. This recess 162 projects vertically into the aircraft body 26 and laterally within the aircraft body 26 at the body top side 42. The recess 162 may also project longitudinally into the aircraft body 26 from the body aft end 38.

Referring to FIG. 4, each aircraft propulsion system 24 is connected (e.g., mechanically fixed) to the aircraft body 26. The housing outer structure 116, for example, is mounted to the aircraft body 26 by a pylon structure 164. With this arrangement, each aircraft propulsion system 24 and its housing outer structure 116 are spaced radially outward/vertically from the aircraft body 26. A propulsion system bypass flowpath 166 is thereby formed by and radially between the aircraft body 26 and the housing outer structure 116. This propulsion system bypass flowpath 166 extends longitudinally along the aircraft body 26 and the housing outer structure 116 from an airflow inlet 168 into the propulsion system bypass flowpath 166 to an airflow exhaust 170 from the propulsion system bypass flowpath 166. The propulsion system bypass inlet 168 is disposed at the outer structure leading edge 124. The propulsion system bypass exhaust 170 is disposed at the outer structure trailing edge 126. The housing outer structure 116 forms a radial inner peripheral boundary of the propulsion system bypass flowpath 166. The aircraft body 26 forms a radial outer peripheral boundary of the propulsion system bypass flowpath 166. The propulsion system bypass flowpath 166 also extends circumferentially about the axis 54 between opposing circumferential open sides of the propulsion system bypass flowpath 166. With the arrangement of FIG. 4, the propulsion system bypass flowpath 166 bypasses (e.g., extends around and outside of) the respective aircraft propulsion system 24.

During operation of each aircraft propulsion system 24, ambient air from the external environment 134 is directed across the counterrotating propulsor rotors 60 and 62 and (in parallel) into the core flowpath 104 through its core inlet 106 and into the powerplant bypass flowpath 136 through its powerplant bypass inlet 138. The air entering the core flowpath 104 may be referred to as "core air". The air entering the powerplant bypass flowpath 136 may be referred to as the "bypass air".

The core air is compressed by the LPC rotor 86 and the HPC rotor 87 and directed into a (e.g., annular) combustion chamber 172 of a (e.g., annular) combustor in the combustor section 83. Fuel is injected into the combustion chamber 172 and mixed with the compressed core air to provide a fuel-air mixture. This fuel-air mixture is ignited and the combustion products thereof flow through and sequentially drive rotation of the HPT rotor 88 and the LPT rotor 89 about the axis 54. The rotation of the HPT rotor 88 and the LPT rotor 89 respectively drive rotation of the HPC rotor 87 and the LPC rotor 86 about the axis 54. The rotation of the LPT rotor 89 also drives rotation of the counterrotating propulsor rotors 60 and 62 about the axis 54 through the drivetrain 100. The rotation of the counterrotating propulsor rotors 60 and 62 propels the bypass air through the powerplant bypass flowpath 136 and out of the respective aircraft propulsion system 24 through the powerplant bypass exhaust 140 to provide forward aircraft thrust. The rotation of the counterrotating propulsor rotors 60 and 62 also propels an external stream of air in the external environment 134 along and outside of the housing inner structure 110 to provide additional aircraft thrust. This propulsion of the bypass air and the external stream of air may account for a majority of thrust generated by the respective aircraft propulsion system 24, e.g., more than seventy-five percent (75%) of thrust. The aircraft propulsion system 24 of the present disclosure, however, is not limited to the foregoing exemplary thrust ratio.

As the bypass air is exhausted from the powerplant bypass flowpath 136 and the combustion products are exhausted from the core flowpath 104, the lobed mixer 150 mixes some of the exhausted bypass air with some of the exhausted combustion products. For example, with the arrangement of FIG. 4 (see also FIG. 8), the lobed mixer 150 mixes the bypass air flowing out of the powerplant bypass exhaust 140 with the combustion products flowing out of a first sector (e.g., a vertical bottom half) of the core exhaust 108 to provide mixed exhaust gas. This mixed exhaust gas may have a different (e.g., slower) flow velocity than the external stream of air flowing above the powerplant bypass exhaust 140. This flow velocity differential may impart a net torque and force on the aircraft 20 which may cause the aircraft 20 and its body forward end 36 (see FIG. 2) to pitch down. Providing the aircraft 20 with a slight propensity to pitch down (or up) may be advantageous for some aircraft designs.

Concurrently with operation of each aircraft propulsion system 24, boundary layer air flowing along the aircraft body 26 is directed into the propulsion system bypass flowpath 166. This boundary layer air is thereby directed around and outside of the respective aircraft propulsion system 24. By routing the boundary layer air outside of the respective aircraft propulsion system 24 and through the propulsion system bypass flowpath 166, each aircraft propulsion system 24 may receive a substantially free stream of air; e.g., clean air, low turbulence air, etc. Directing this free stream of air into each aircraft propulsion system 24 may increase propulsion system efficiency.

In some embodiments, referring to FIG. 7, each of the mixer lobes 160 may be circumferentially aligned with a respective one of the guide vanes 152. Such an arrangement may reduce aerodynamic drag along the powerplant bypass flowpath 136. In other embodiments, however, one or more of the mixer lobes 160 may alternatively be slightly or completely circumferentially offset from a respective circumferentially closest one of the guide vanes 152.

In some embodiments, referring to FIG. 7, the guide vanes 152 may be variably spaced (e.g., non-equispaced) circumferentially about the axis 54. For example, the guide vanes 152 closest to the structure sides 128 may be closer together than the guide vanes 152 in a middle of the powerplant bypass flowpath 136. Each circumferentially neighboring (e.g., adjacent) pair of the guide vanes 152, for example, are spaced circumferentially apart by a circumferential distance 174; e.g., measured along the outer peripheral boundary of the powerplant bypass flowpath 136. The distance 174 between the neighboring guide vanes 1521 and 1522 is less than the distance 174 between the neighboring guide vanes 1522 and 1523, the distance 174 between the neighboring guide vanes 1522 and 1523 is less than the distance 174 between the neighboring guide vanes 1523 and 1524, and the distance 174 between the neighboring guide vanes 1523 and 1524 is less than the distance 174 between the neighboring guide vanes 1524 and 1525. With such an arrangement, the guide vanes 152 may be tuned to reduce or prevent pressure oscillations on the counterrotating propulsor rotors 60 and 62 imparted by the provision of the lobed mixer 150 and/or the canted powerplant bypass exhaust 140 (see FIG. 4).

Figure 9B:
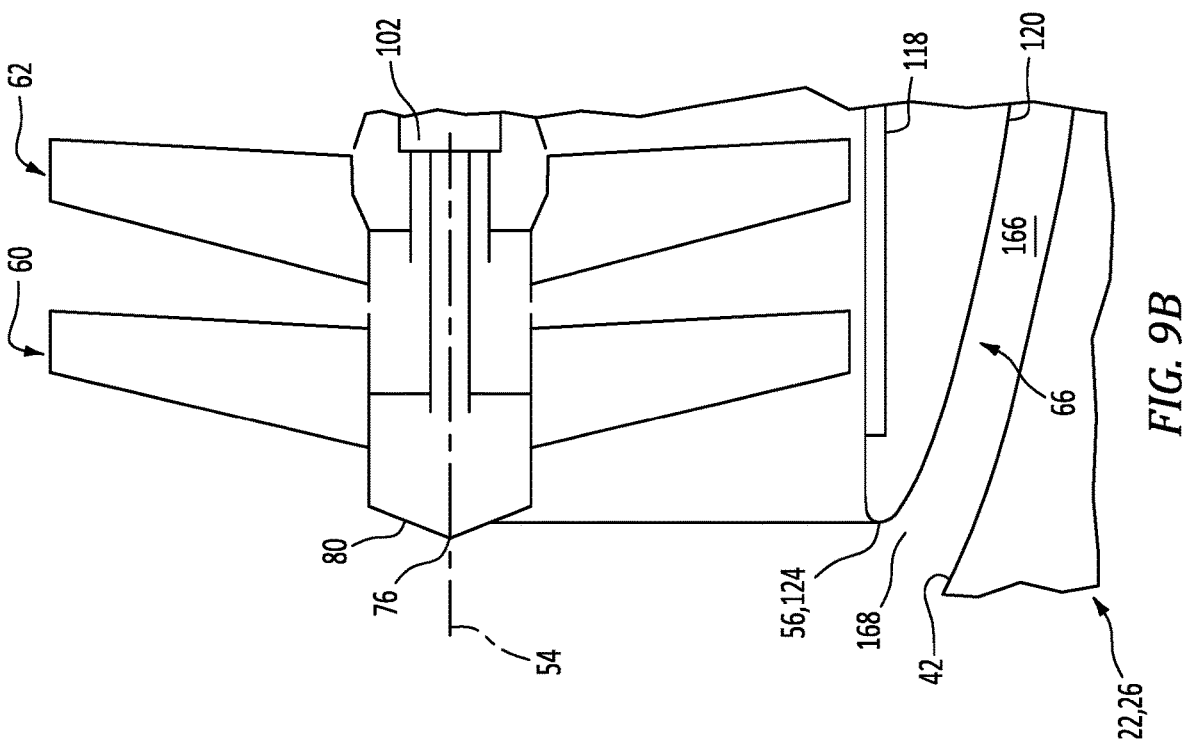
FIGS. 9A and 9B are partial schematic side sectional illustrations of the propulsion system with various other nose cone arrangements.
Figure 9A:
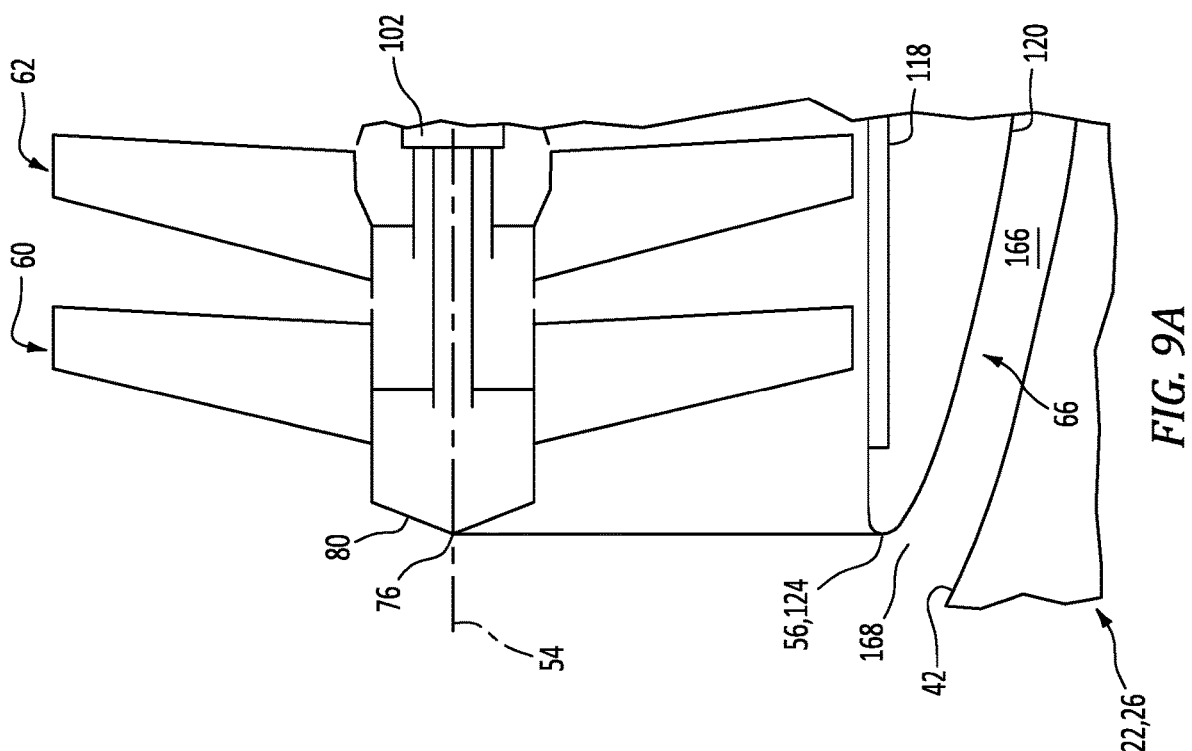

In some embodiments, referring to FIG. 4, a tip 176 of the nose cone 80 may be axially recessed from the outer structure leading edge 124 by a distance 178. This distance 178 may be equal to or less than one-half of a diameter 180 of the closest propulsor rotor; e.g., the first propulsor rotor 60. In other embodiments, referring to FIG. 9A, the tip 176 of the nose cone 80 may be axially aligned with the outer structure leading edge 124. In still other embodiments, referring to FIG. 9B, the nose cone 80 may project axially out from the outer structure leading edge 124 to the tip 176.

Figure 10B:
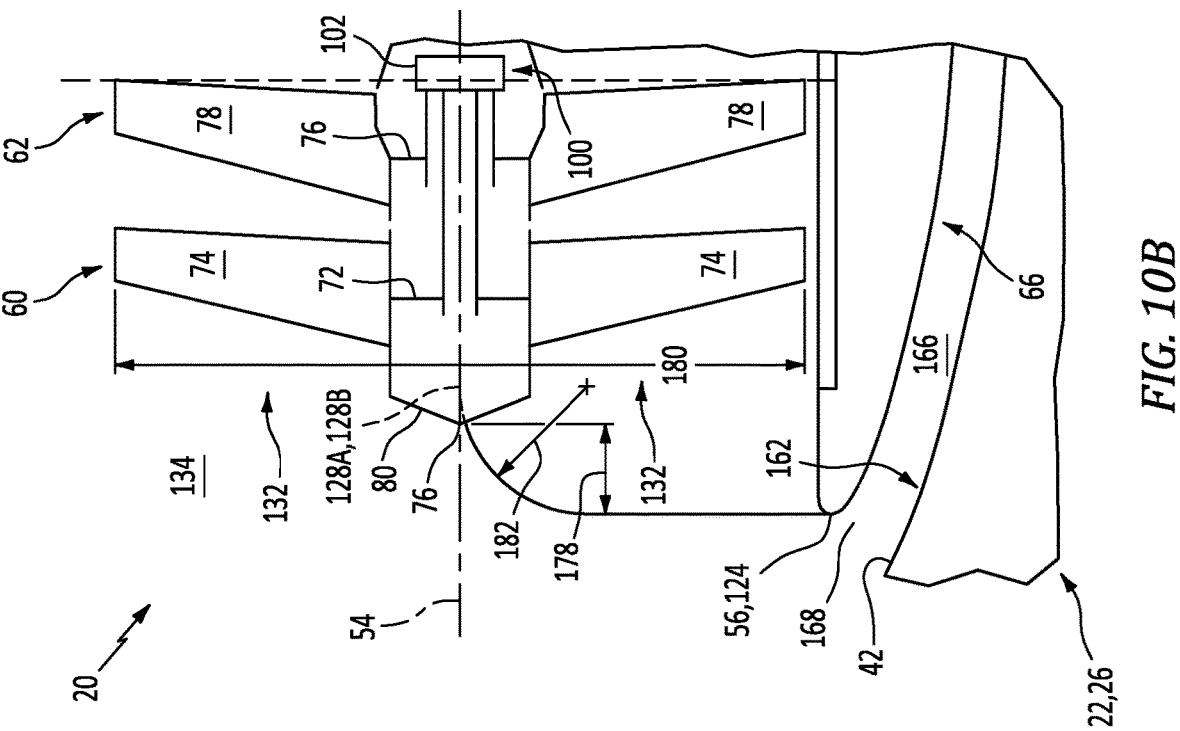
FIGS. 10A and 10B are partial schematic side sectional illustrations of the propulsion system with various other housing arrangements.
Figure 10A:
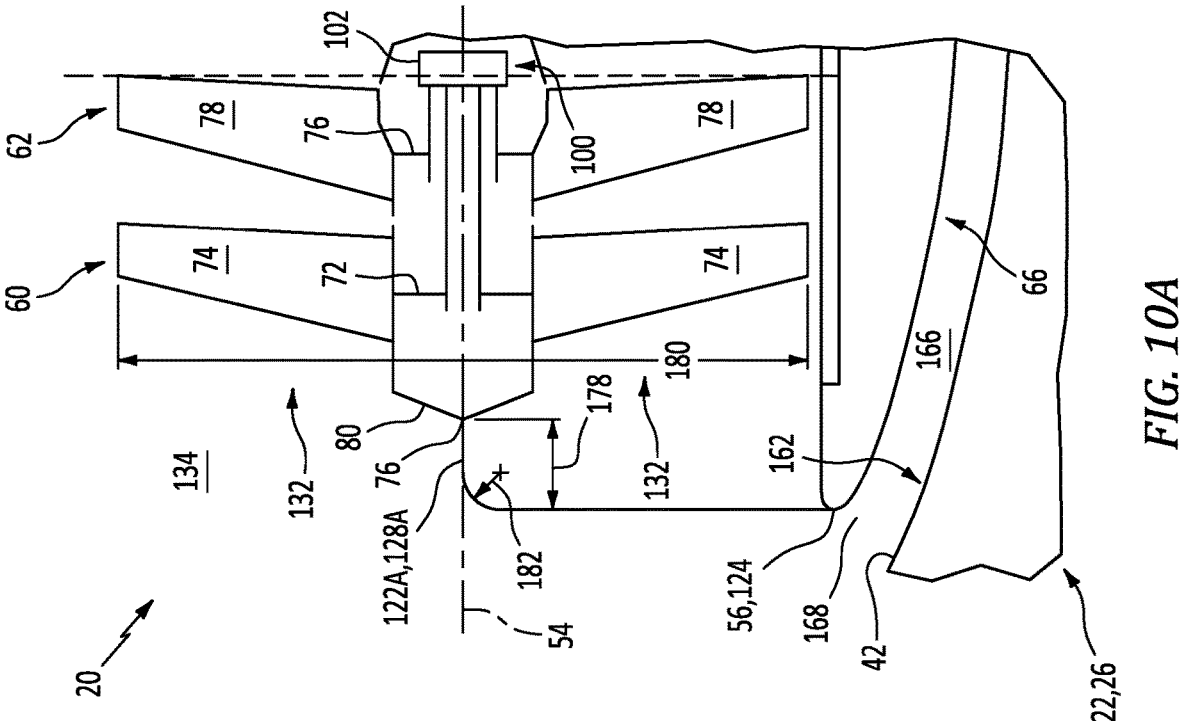

In some embodiments, referring to FIGS. 10A and 10B, each corner of the housing outer structure 116 and its members 118 and/or 120 may be cased (e.g., rounded, chamfered, etc.) at the propulsion system forward end 56/the leading edge 124. Each corner of FIGS. 10A and 10B, for example, is rounded with a corner radius 182. In some embodiments, referring to FIG. 10A, the corner radius 182 may be equal to or less than one-half (½) of the distance 178. In other embodiments, referring to FIG. 10B, the corner radius 182 may be equal to or greater than the distance 178; e.g., up to two times (2×) the distance 178.

Figure 11:
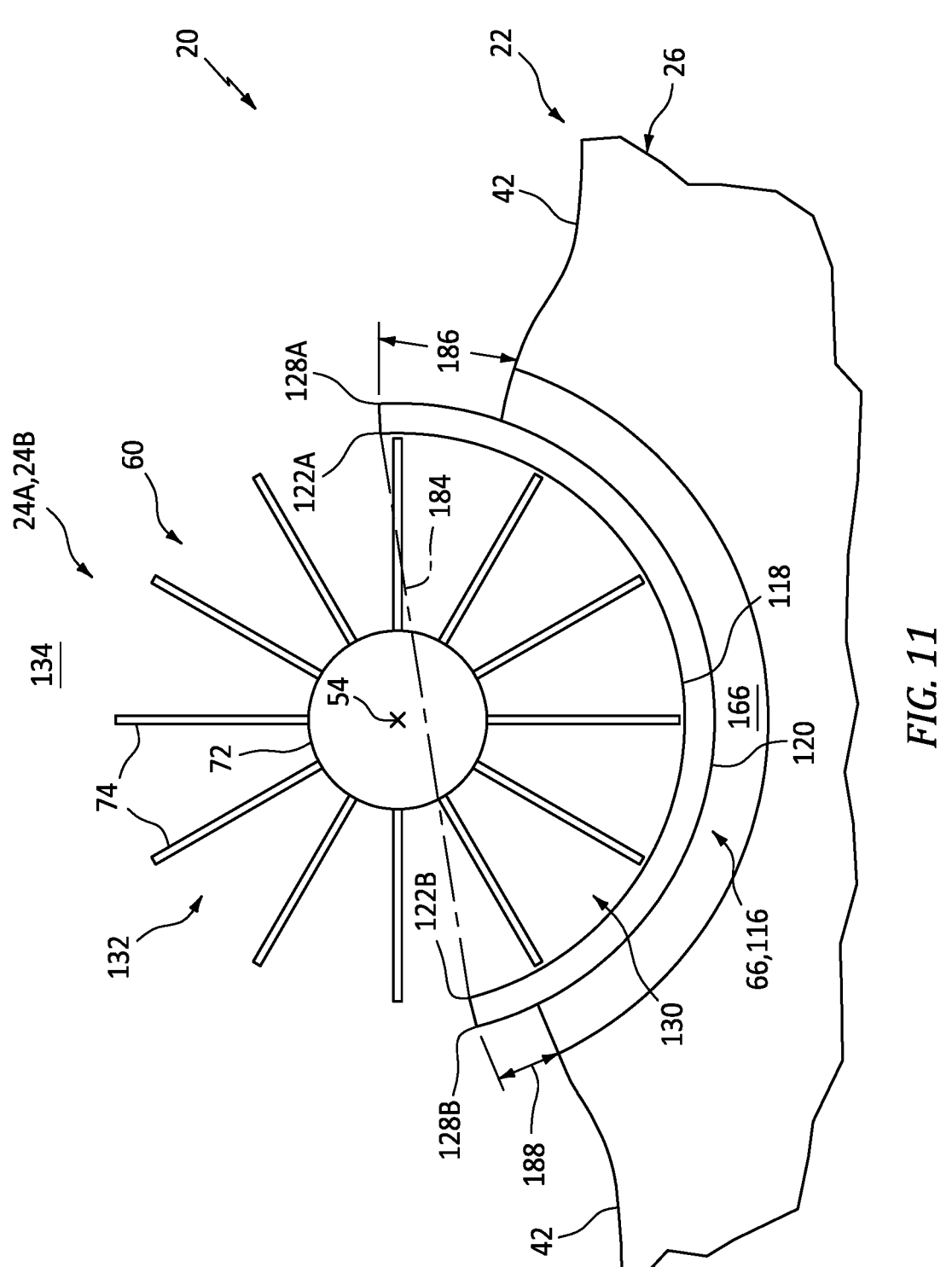
FIG. 11 is a partial front end view illustration of a first propulsion system mounted to the aircraft.
Figure 12:
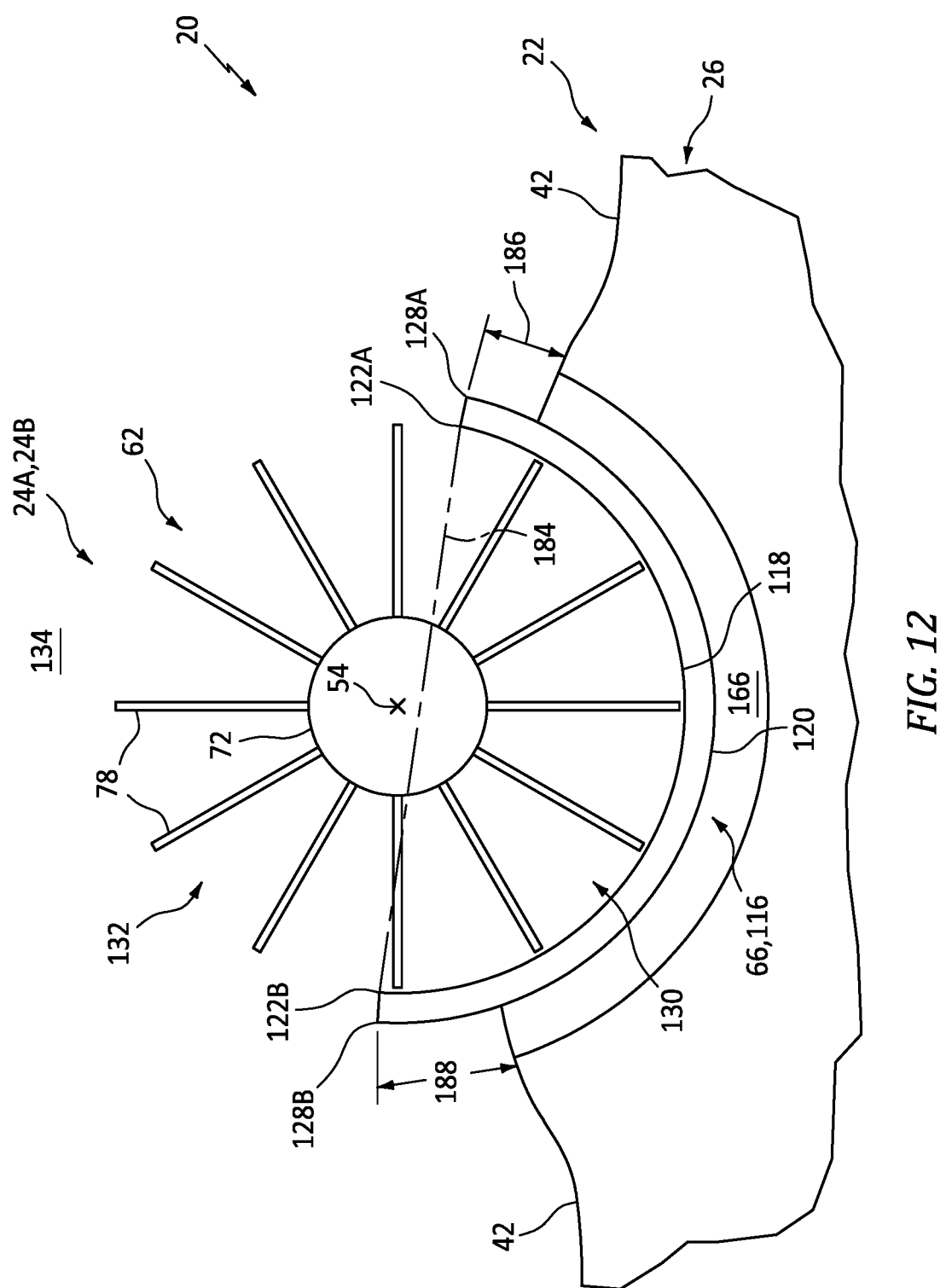
FIG. 12 is a partial front end view illustration of a second propulsion system mounted to the aircraft.

In some embodiments, referring to FIGS. 5 and 6, the circumferential sides 122A and 122B of the outer case 118 may be aligned; e.g., vertically aligned with respect to the gravitational direction when the aircraft is flying in level flight. Similarly, the circumferential sides 128A and 128B of the nacelle outer structure 120 may be aligned; e.g., vertically aligned with respect to the gravitational direction when the aircraft is flying in level flight. Moreover, the respective sides 122A and 128A, 122B and 128B may be aligned; e.g., vertically aligned with respect to the gravitational direction when the aircraft is flying in level flight. The present disclosure, however, is not limited to such an exemplary arrangement. For example, referring to FIGS. 11 and 12, the circumferential sides 122A and 122B of the outer case 118 may be misaligned; e.g., vertically offset from one another with respect to the gravitational direction when the aircraft is flying in level flight. Similarly, the circumferential sides 128A and 128B of the nacelle outer structure 120 may be misaligned; e.g., vertically offset from one another with respect to the gravitational direction when the aircraft is flying in level flight. Thus, a reference line 184 extending through the sides 122A and 122B and/or 128A and 128B is angularly offset from the horizon line when the aircraft is flying in level flight. In addition, a distance 186 between the side 122A, 128A and the body top side 42 may be equal to or different than a distance 188 between the side 122B, 128B and the body top side 42. In particular, the housing outer structure 116 and its members 118 and/or 120 may be configured (e.g., shaped, positioned, oriented, etc.) based on a contour of the body top side 42 and/or flow dynamics between the aircraft propulsion systems 24.

Figure 13:
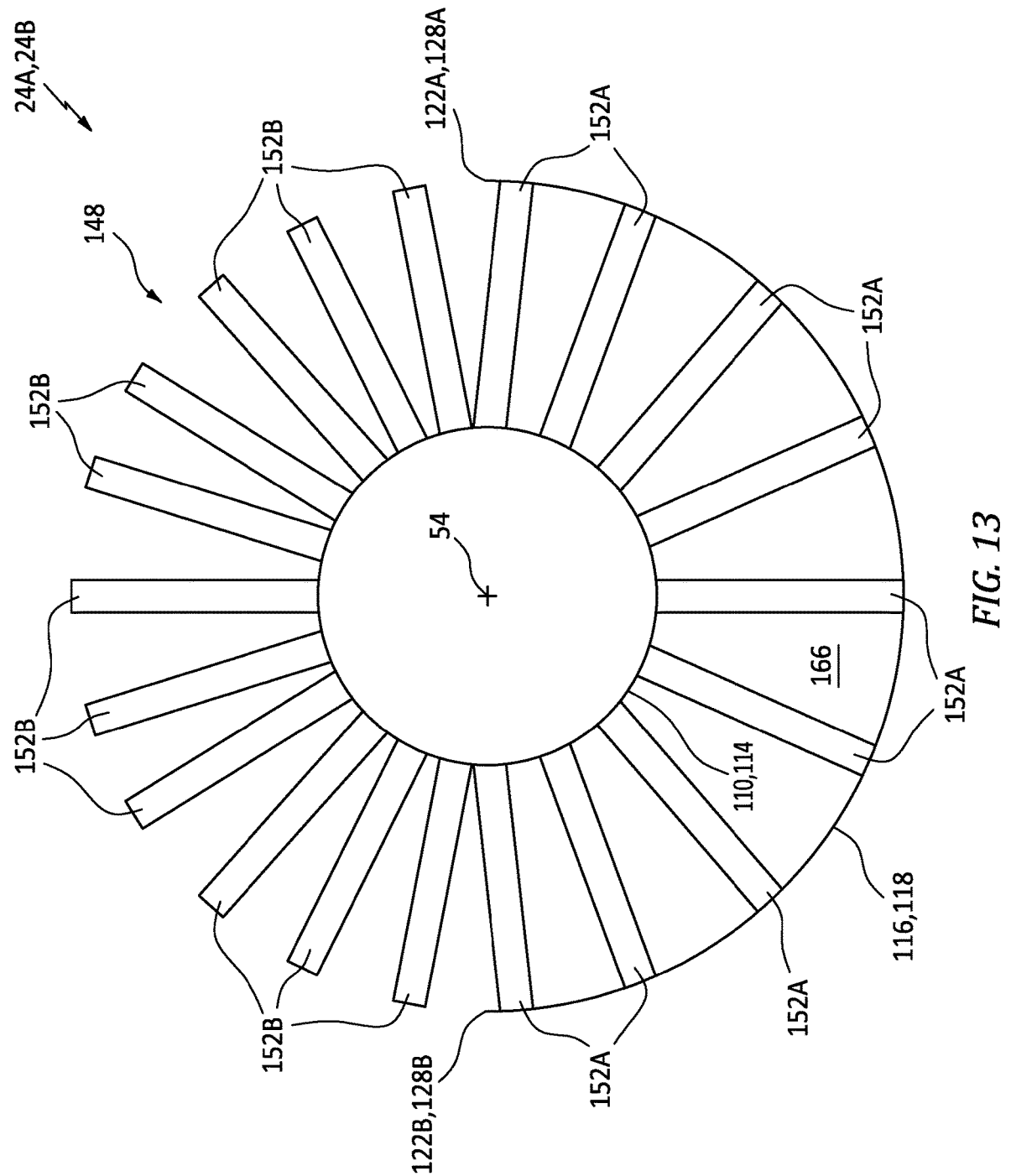
FIG. 13 is a schematic cross-sectional illustration of the propulsion system with an annular guide vane array.
Figure 14:
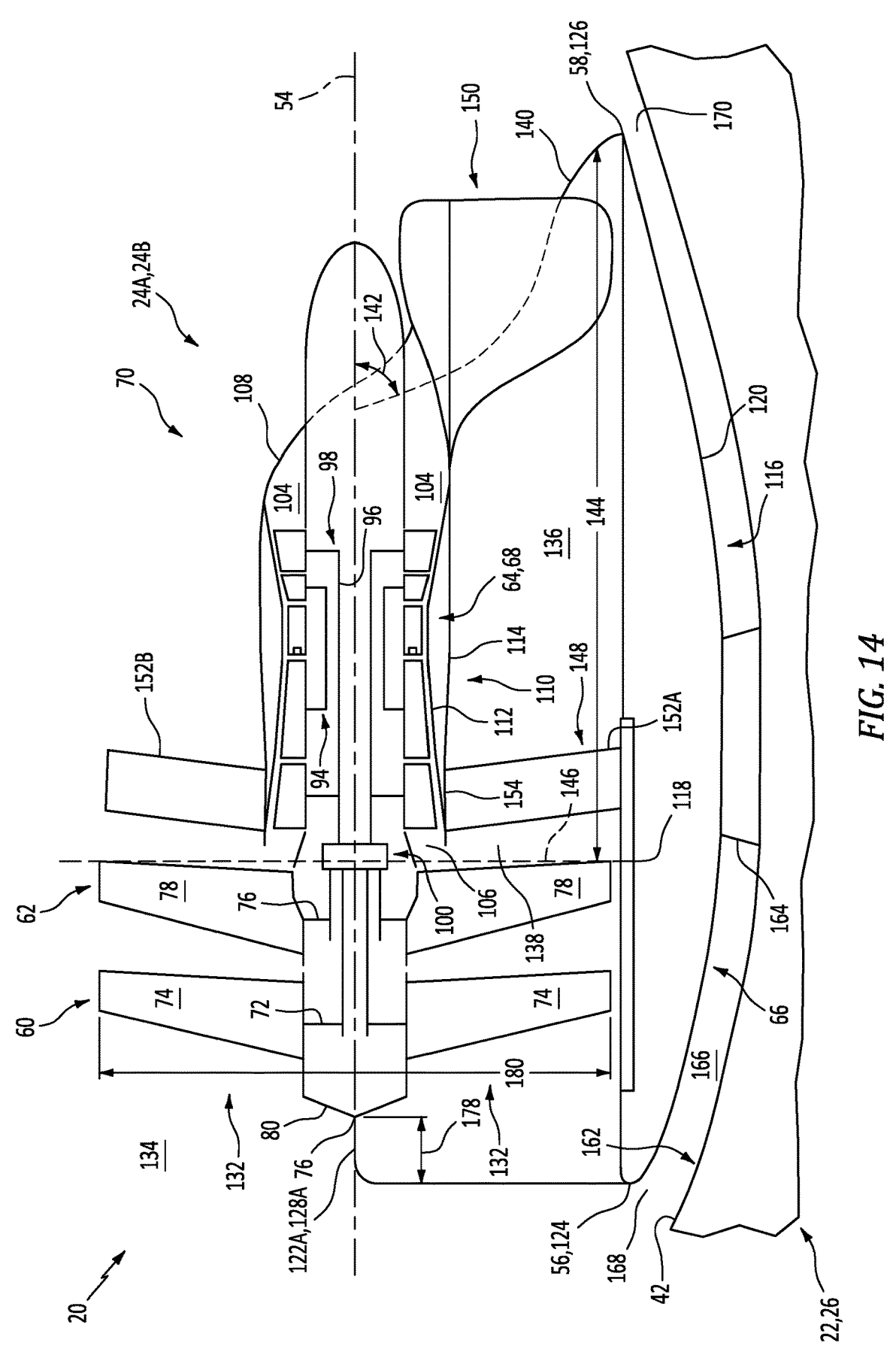
FIG. 14 is a schematic side sectional illustration of the propulsion system mounted to the airframe component, where the propulsion system includes the annular guide vane array with fixed open guide vanes.
Figure 15:
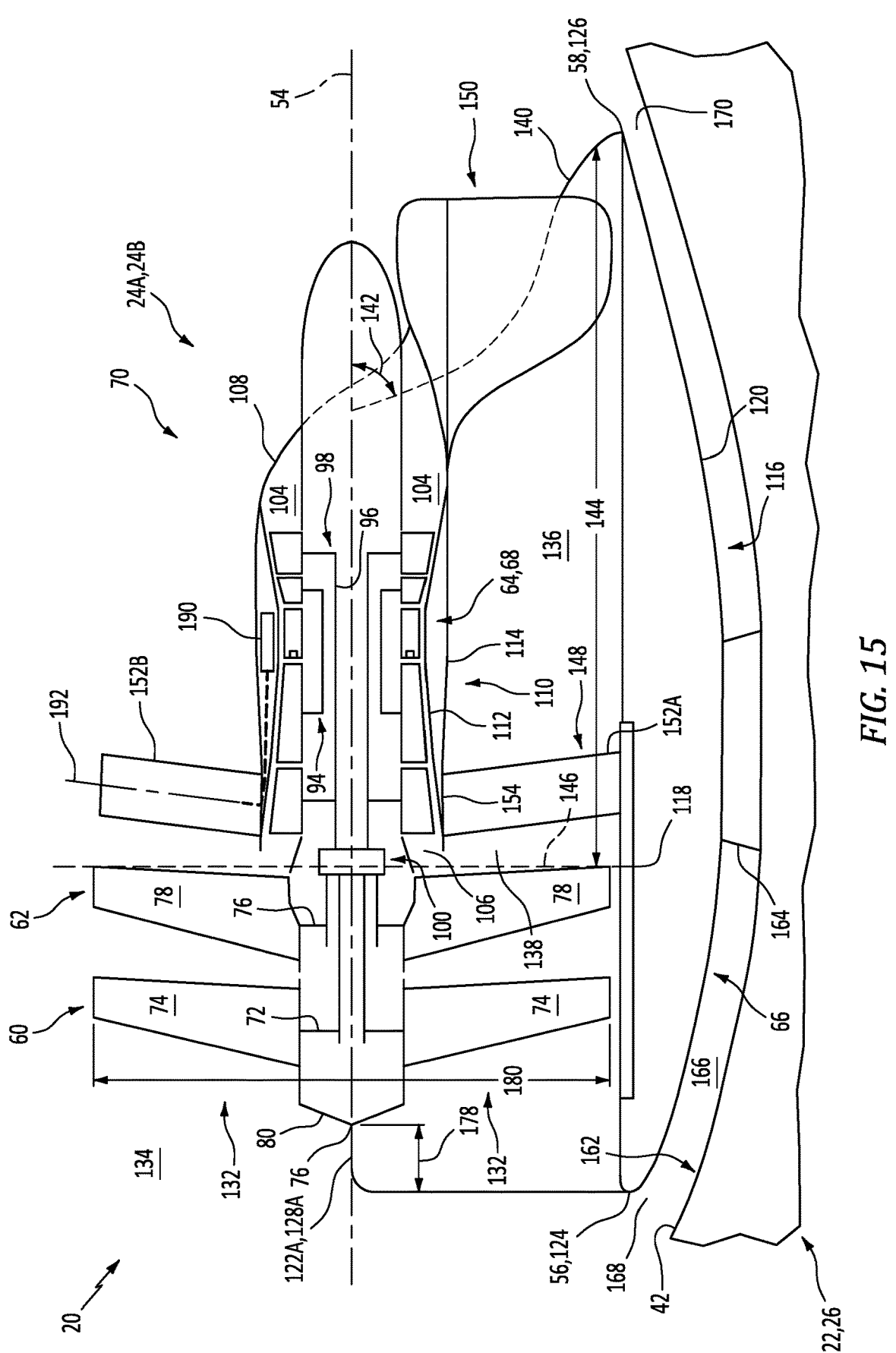
FIG. 15 is a schematic side sectional illustration of the propulsion system mounted to the airframe component, where the propulsion system includes the annular guide vane array with variable open guide vanes.

In some embodiments, referring to FIG. 7, the guide vane structure 148 may be configured with the arcuate array of the guide vanes 152 about the axis 54. In other embodiments, referring to FIG. 13, the guide vane structure 148 may alternatively be configured with a full annular array of guide vanes 152A and 152B (generally referred to as "152") about the axis 54. The guide vane structure 148 of FIGS. 14 and 15 and its ducted guide vanes 152A may thereby condition (e.g., straighten) the air propelled within the powerplant bypass flowpath 136, and the guide vane structure 148 and its open guide vanes 152B may condition (e.g., straighten) the air propelled within the external environment 134/outside of the powerplant bypass flowpath 136. In some embodiments, referring to FIG. 14, one or more or all of the open guide vanes 152B may be fixed guide vanes. In other embodiments, referring to FIG. 15, one or more or all of the open guide vanes 152B may be variable guide vanes. An actuation system 190, for example, may be included to move (e.g., pivot) each open guide vane 152B about a respective pivot axis 192. By contrast, the ducted guide vanes 152A of FIG. 15 (e.g., as well as of FIG. 14) may be fixed guide vanes.

In some embodiments, referring to FIG. 4, each aircraft propulsion system 24 may include multiple of the propulsor rotors 60 and 62. In other embodiments, however, each aircraft propulsion system 24 may be configured with a single propulsor rotor; e.g., the propulsor rotor 60 or 62 may be omitted.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
   a first propulsor rotor;
   a powerplant configured to drive rotation of the first propulsor rotor about an axis; and
   a propulsion system housing including an inner structure and an outer structure with a bypass flowpath radially between the inner structure and the outer structure, the bypass flowpath downstream of the first propulsor rotor and extending axially along the inner structure and the outer structure within the propulsion system housing, the inner structure extending axially along and circumferentially around the powerplant, the outer structure extending axially along and partially circumferentially about the first propulsor rotor to cover an outer periphery of a first circumferential sector of the first propulsor rotor, wherein a remaining second circumferential sector of the first propulsor rotor is open to an environment outside of the propulsion system housing;

a plurality of guide vanes arranged circumferentially about the axis, each of the plurality of guide vanes extending radially across the bypass flowpath and coupling the inner structure to the outer structure; and a pylon projecting radially out from the outer structure, wherein the pylon axially overlaps the plurality of guide vanes.

2. The assembly of claim 1, wherein the first circumferential sector extends circumferentially about the axis between ninety degrees and two-hundred and forty degrees; and the remaining second circumferential sector extends circumferentially about the axis between and to opposing circumferential ends of the first circumferential sector.

3. The assembly of claim 1, wherein a first portion of the first propulsor rotor within the first circumferential sector is operable as a ducted propulsor rotor; and a second portion of the first propulsor rotor within the first circumferential sector is operable as an open propulsor rotor.

4. The assembly of claim 1, wherein the propulsion system housing comprises a nacelle.

5. The assembly of claim 1, wherein the plurality of guide vanes includes a first guide vane, a second guide vane and a third guide vane disposed circumferentially between and next to the first guide vane and the second guide vane, the first guide vane is circumferentially spaced from the third guide vane by a first circumferential distance, and the second guide vane is circumferentially spaced from the third guide vane by a second circumferential distance that is different than the first circumferential distance.

6. An assembly for an aircraft, comprising:

a first propulsor rotor;

a powerplant configured to drive rotation of the first propulsor rotor about an axis;

a propulsion system housing including an inner structure and an outer structure with a bypass flowpath radially between the inner structure and the outer structure, the bypass flowpath downstream of the first propulsor rotor and extending axially along the inner structure and the outer structure within the propulsion system housing, the inner structure extending axially along and circumferentially around the powerplant, the outer structure extending axially along and partially circumferentially about the first propulsor rotor to cover an outer periphery of a first circumferential sector of the first propulsor rotor, wherein a remaining second circumferential sector of the first propulsor rotor is open to an environment outside of the propulsion system housing;

a plurality of guide vanes arranged circumferentially about the axis, each of the plurality of guide vanes extending radially across the bypass flowpath and coupling the inner structure to the outer structure; and a lobed mixer configured to mix bypass air exhausted from the bypass flowpath with combustion products exhausted from a turbine engine core, the powerplant comprising the turbine engine core;

the lobed mixer configured with a plurality of mixer lobes, and each of the plurality of mixer lobes circumferentially aligned with a respective one of the plurality of guide vanes.

7. The assembly of claim 1, wherein the plurality of guide vanes comprises a plurality of ducted guide vanes, and the assembly further comprises a guide vane structure including the plurality of ducted guide vanes and a plurality of open guide vanes arranged with the plurality of ducted guide vanes in an annular array about the axis.

8. The assembly of claim 1, further comprising an arcuate guide vane structure comprising the plurality of guide vanes.

9. The assembly of claim 1, further comprising:

a lobed mixer configured to mix bypass air exhausted from the bypass flowpath with combustion products exhausted from a turbine engine core, the powerplant comprising the turbine engine core;

the lobed mixer extending axially along and partially circumferentially about the axis, and the lobed mixer circumferentially aligned with the outer structure about the axis.

10. The assembly of claim 1, further comprising:

a second propulsor rotor;

the powerplant configured to drive rotation of the first propulsor rotor a first direction about the axis, and the powerplant configured to drive rotation of the second propulsor rotor a second direction about the axis.

11. The assembly of claim 1, wherein the powerplant comprises a turbine engine core.

12. The assembly of claim 1, further comprising:

a nose cone upstream of and rotatable with the first propulsor rotor;

a tip of the nose cone axially aligned with or axially recessed from a leading edge of the outer structure.

13. The assembly of claim 1, further comprising:

an airframe structure;

an aircraft propulsion system mounted to the airframe structure by the pylon, the aircraft propulsion system including the first propulsor rotor, the powerplant and the propulsion system housing; and a second bypass flowpath formed by and between the outer structure and the airframe structure, the second bypass flowpath extending axially along the outer structure and the airframe structure outside of the aircraft propulsion system.

14. The assembly of claim 13, wherein the airframe structure is configured as a fuselage of a blended wing body aircraft.

15. The assembly of claim 13, wherein the aircraft propulsion system is disposed in a recess in the airframe structure.

16. The assembly of claim 1, wherein a corner between a leading edge of the outer structure and a circumferential side of the outer structure is eased.

17. An assembly for an aircraft, comprising:

a first propulsor rotor;

a powerplant configured to drive rotation of the first propulsor rotor about an axis; and a propulsion system housing including an inner structure, an outer structure and a plurality of guide vanes with a bypass flowpath radially between the inner structure and the outer structure, the bypass flowpath downstream of the first propulsor rotor and extending axially along the inner structure and the outer structure within the propulsion system housing, the inner structure circumscribing the powerplant, the outer structure extending circumferentially about the first propulsor rotor and the inner structure between opposing circumferential sides of the outer structure, each of the opposing circumferential sides of the outer structure exposed to an environment outside of the propulsion system housing, and each of the plurality of guide vanes extending radially across the bypass flowpath from the inner structure to the outer structure;

wherein the plurality of guide vanes includes a first guide vane, a second guide vane and a third guide vane disposed circumferentially between and next to the first guide vane and the second guide vane, the first guide vane is circumferentially spaced from the third guide vane by a first circumferential distance, and the second guide vane is circumferentially spaced from the third guide vane by a second circumferential distance that is different than the first circumferential distance.

\* \* \* \* \*